United States Patent [19]
Yoshida et al.

[11] Patent Number: 4,949,204
[45] Date of Patent: Aug. 14, 1990

[54] TAPE RECORDER FOR PLAYING ENDLESS MAGNETIC TAPE

[75] Inventors: Kobun Yoshida, Sayama; Toshiro Mori, Musashino, both of Japan

[73] Assignee: TEAC Corporation, Tokyo, Japan

[21] Appl. No.: 224,660

[22] Filed: Jul. 26, 1988

[30] Foreign Application Priority Data

Jul. 27, 1987 [JP] Japan ................................ 62-187256
Aug. 27, 1987 [JP] Japan ................................ 62-211316

[51] Int. Cl.⁵ ........................ G11B 15/18; G11B 15/61
[52] U.S. Cl. ................................ 360/93; 242/55.19 R; 360/71; 360/85
[58] Field of Search .................. 360/93, 90, 83, 84, 360/71, 85; 242/192, 55.18, 55.19 R, 55.19 A

[56] References Cited
U.S. PATENT DOCUMENTS 3,140,837 7/1964 Cailliot .................... 242/55.19 A
3,235,195 2/1966 Hebbet et al. ..................... 360/93
4,054,925 10/1977 Townes et al. .................... 360/90 X

FOREIGN PATENT DOCUMENTS 95204 7/1979 Japan .
95205 7/1979 Japan .
145556 11/1981 Japan .

Primary Examiner—David J. Severin
Attorney, Agent, or Firm—Michael N. Meller

[57] ABSTRACT

A video tape recorder records and/or reproduces an information signal on and/or from an endless magnetic tape having a shape of an endless loop. A large portion of the tape is accommodated within a stationary reel, and an endless belt guided by rollers on the stationary reel is provided in an approximate C-shape. The tape is wound around an outer portion of the endless belt in a form of a tape roll, and a remaining portion of the tape forms a predetermined tape path. When the tape is transported in a forward direction, the tape is drawn out from an innermost turn of the tape roll and is taken up on an outermost turn of the tape roll. The information signal is recorded and/or reproduced on and/or from the tape in the predetermined tape path between the innermost and outermost turns of the tape roll by rotary magnetic heads located on the inside of the stationary reel.

10 Claims, 6 Drawing Sheets

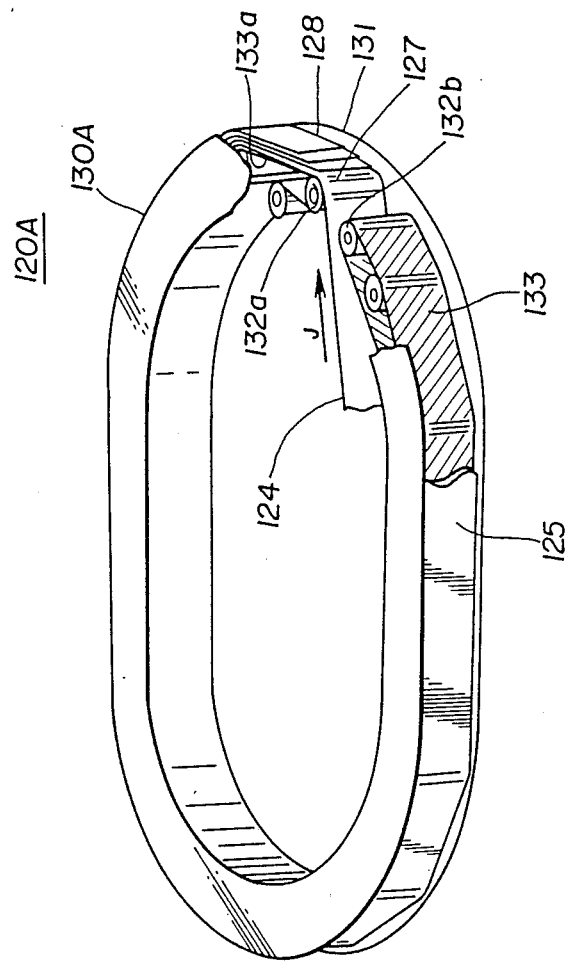

TAPE RECORDER FOR PLAYING ENDLESS MAGNETIC TAPE

BACKGROUND OF THE INVENTION

The present invention generally relates to video tape recorders, and more particularly to a video tape recorder for recording and/or reproducing an information signal on and/or from an endless magnetic tape which has the shape of an endless loop.

There are strict requirements on video tape recorders, and it is required that a load acting on the tape transport is small, a change in the load is small and the tape transport is stable. As one type of video tape recorder, there is an endless video tape recorder which plays an endless magnetic tape which has the shape of an endless loop. In such an endless video tape recorder, the endless magnetic tape is wound on a stationary reel in the form of a tape roll and the tape is drawn out to the inside of the stationary reel from an innermost turn of the tape roll. However, because the tape is wound on the stationary reel, a load acting on the tape transport is large due to friction between the tape and the stationary reel. Hence, measures must be taken to reduce the load acting on the tape transport.

FIG. 1 shows an essential part of an example of the conventional endless video tape recorder In FIG. 1, the essential part of the endless video tape recorder has a stationary reel 1 which cannot rotate, a stationary head 2, a capstan 3, a pinch roller 4, an endless magnetic tape 5 which has the shape of an endless loop, and a tape roll 6 made up of the tape 5 which is wound on the stationary reel 1.

When the capstan 3 is rotated in a direction A and the tape 5 is driven in a state pinched between the capstan 3 and the pinch roller 4, the tape 5 at an inntermost turn of the tape roll 6 is drawn to the inside of the stationary reel 1. The drawn out tape 5 makes sliding contact with the stationary head 2 and is then guided by an overturn guide 7. The transport direction of the tape 5 is changed by the overturn guide 7 and the tape 5 reaches an outermost turn of the tape roll 6 to be taken up on the stationary reel 1. The tape 5 is thus transported in a forward direction A1 when the capstan 3 rotates in the direction A.

The stationary reel 1 is made up of a hub 8 and a flange 9. Because the hub 8 cannot rotate, a tape portion 5i of the tape 5 at the innermost turn of the tape roll 6 constantly makes sliding contact with the peripheral surface of the hub 8 for the full angular range of 360 degrees. For this reason, the load acting on the tape transport is large at the innermost turn of the tape roll 6, and this large load easily changes due to a temperature change, a stretch generated in the tape 5 itself and the like. As a result, there are problems in that the tape transport is unstable and causes a jitter, a skew and the like in a reproduced information signal. When a video signal is reproduced, it is difficult to obtain a satisfactory reproduced picture because of the unstable tape transport.

On the other hand, when recording an information signal on the tape 5, there is often a need to reproduce a portion of the information signal recorded slightly before. In this case, it would be useful if it were possible to transport the tape 5 in a reverse direction B1 But when the capstan 3 is rotated in a direction B so as to transport the tape 5 in the reverse direction B1 in the conventional endless video tape recorder, the tape 5 is drawn out from the outermost turn of the tape roll 6 but is not properly fed to the inntermost turn of the tape roll 6. The tape 5 cannot be taken up at the inntermost turn of the tape roll 6 because of the flexibility of the tape 5. As a result, the tape 5 builds up at the entrance of the inntermost turn of the roll 6 without being taken up, thereby causing a large load on the tape transport due to the large tape friction generated in the stationary reel 1. Therefore, it is impossible to transport the tape 5 in the reverse direction B1 against the large tape friction.

In other words, when there is a need to reproduce a desired portion of the information signal recorded slightly before, the tape 5 must be transported in the forward direction A1 for almost the full length of the tape 5 in order to find the desired portion since the tape 5 cannot be transported in the reverse direction B1. Hence, there is a problem in that it takes time to find the desired portion and the operation of finding the desired portion is troublesome to carry out.

SUMMARY OF THE INVENTION

Accordingly, it is a general object of the present invention to provide a novel and useful video tape recorder in which the problems described heretofore are eliminated.

Another and more specific object of the present invention is to provide a video tape recorder having a stationary reel structure having such a construction that a load acting on the tape transport of an endless magnetic tape is effectively reduced. According to the video tape recorder of the present invention, it is possible to stabilize the tape transport.

Still another object of the present invention is to provide a video tape recorder having a stationary reel structure having such a construction that an endless magnetic tape can be transported in a reverse direction. According to the video tape recorder of the present invention, it is easy to find an arbitrary position on the endless magnetic tape because the endless magnetic tape can be transported in the reverse direction, and the operation of the video tape recorder is facilitated.

Other objects and further features of the present invention will be apparent from the following detailed description when read in conjunction with the accompanying drawings.

BRIEF DESCRIPTION OF THE DRAWINGS

FIG. 8 is a perspective view with a part cut away showing a modification of the stationary reel structure shown in FIG. 6.

DETAILED DESCRIPTION

Figure 1:
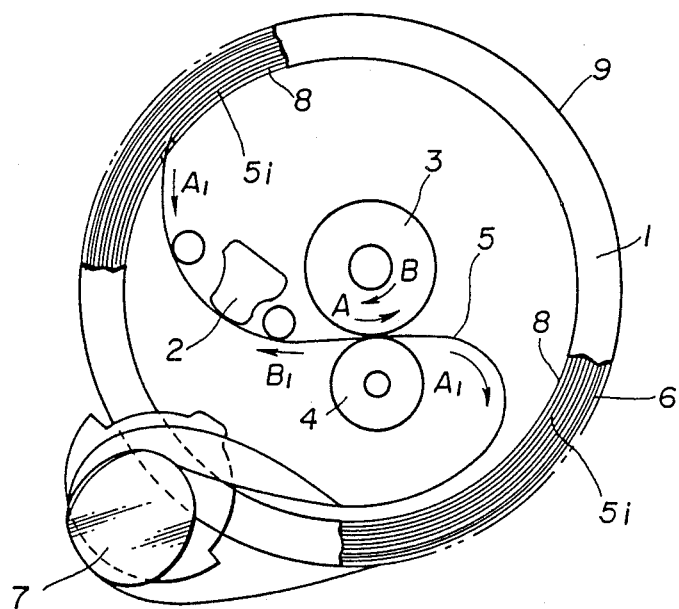
FIG. 1 is a plan view showing an essential part of example of the conventional endless video tape recorder.
Figure 2:
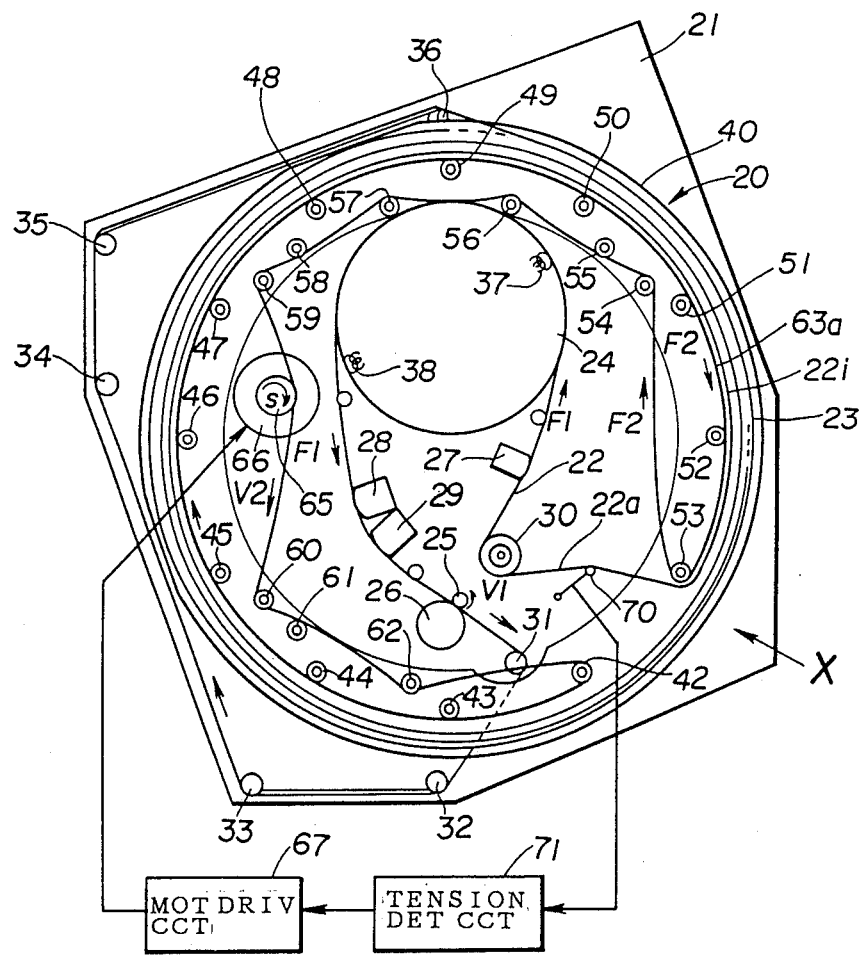
FIG. 2 is a plan view showing a stationary reel structure of a first embodiment of the video tape recorder according to the present invention with an upper flange of the stationary reel omitted.

FIG. 2 is a plan view of a stationary reel structure of a first embodiment of the video tape recorder according to the present invention with an upper flange of the stationary reel omitted.

In FIG. 2, a stationary reel 20 having a large diameter is fixed on a chassis 21. A description of the stationary reel 20 will be given later. An endless magnetic tape 22 is wound on the stationary reel 20, and a tape roll 23 on the stationary reel 20 is made up of one hundred and several tens of turns of the tape 22, for example. A guide drum 24 having rotary magnetic heads for recording and/or reproduction, a capstan 25 and a pinch roller 26 are provided on the inside of the stationary reel 20 in the plan view.

A full width erase head 27, an audio head 28, a control head 29 and an impedance roller 30 are also arranged on the inside of the stationary reel 20 in the plan view. A guide pole 31 is arranged on the inside of the stationary reel 20 and guide poles 32 through 36 are arranged on the outside of the stationary reel 20 in the plan view.

In a recording mode or a reproducing mode, the tape 22 is driven in a state pinched between the capstan 25 and the pinch roller 26 and is transported in a forward direction F1 at a speed v1. The tape 22 is drawn out horizontally to the inside of the stationary reel 20 in the plan view and is wrapped partially around the impedance roller 30 before reaching an outer peripheral surface of the guide drum 24. The tape 22 is wrapped obliquely around the outer peripheral surface of the guide drum 24 for approximately 180 degrees and is transported while making sliding contact with the outer peripheral surface of the guide drum 24. A pair of rotary magnetic heads 37 and 38 mounted on the guide drum 24 alternately scan the tape 22 in accordance with the so-called helical scan system. Accordingly, in the recording mode, a video signal is recorded on tracks formed obliquely to the longitudinal direction of the tape 22, and the recorded video signal is reproduced from the oblique tracks of the tape 22 in the reproducing mode.

The tape 22 which finishes making contact with the outer peripheral surface of the guide drum 24 extends obliquely downwardly and makes contact with the heads 28 and 29. Then, the tape 22 is driven in the state pinched between the capstan 25 and the pinch roller 26, guided by the guide pole 31 and passes under the stationary reel 20 to the outside of the stationary reel 20 in the plan view. The tape 22 on the outside of the stationary reel 20 is successively guided by the guide poles 32, 33, 34 and 35 and extends obliquely upwardly. Finally, the tape 22 is guided by the guide pole 36 to assume the same height position as the stationary reel 20 and is directed to the outermost turn of the tape roll 23 to be taken up thereon. The tape roll 23 as a whole rotates clockwise.

The tape 22 has the shape of an endless loop. For this reason, the tape 22 is drawn out from the inntermost turn of the tape roll 23 while the tape 22 is taken up at the outermost turn of the tape roll 23. As a result, the tape roll 23 rotates clockwise independently of the stationary reel 20 in an endless manner. The recording and/or reproduction of the video signal on and/or from the tape 22 is thus carried out in an endless manner.

Next, a description will be given of the structure of the stationary reel 20 and an internal mechanisms provided in the stationary reel 20.

Figure 3:
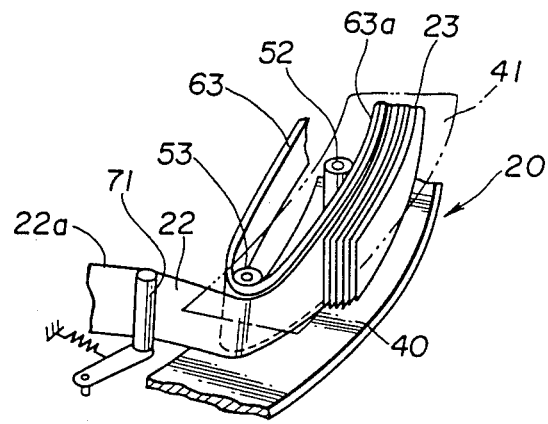
FIG. 3 is a perspective view of a part of the stationary reel structure viewed from a direction X in FIG. 2.

As shown in FIGS. 2 and 3, the stationary reel 20 has a lower flange 40, an upper flange 41 (omitted in FIG. 2), rollers 42 through 53 provided at equi-angular intervals along the periphery of the stationary reel 20, and an endless belt 63. The rollers 42 through 53 guide the belt 63 so as not to make contact with the guide drum 24 and the like. The belt 63 has a loop shape and is provided around the rollers 42 through 62 in an approximately C-shape along the inner periphery of the stationary reel 20. The belt 63 has a C-shaped path 63a which starts from the roller 42 and ends at the roller 53 and extends for approximately the entire periphery of the stationary reel 20.

The tape roll 23 is provided on the outer side of the belt 63 which forms the path 63a and the height position of the tape roll 23 is restricted by the upper and lower flanges 40 and 41. The tape 22 at the inntermost turn of the tape roll 23 is wound around the path 63a, and subsequent turns of the tape 22 are successively wound over the inntermost turn thereby constituting the tape roll 23.

Figure 4:
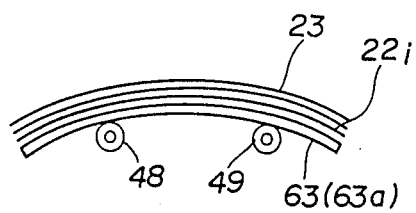
FIG. 4 is a plan view on an enlarged scale showing a part of a tape roll in the stationary reel structure shown in FIG. 2.

The belt 63 is made of rubber, for example, and has an appropriate resiliency so that the belt 63 curves outwardly between two mutually adjacent rollers as shown in FIG. 4 which shows a vicinity of the rollers 48 and 49. Hence, the path 63a is close to a perfect circle. For this reason, the contour of the tape roll 23 is also close to a perfect circle.

An internal driving mechanism of the stationary reel 20 constitutes a belt transporting means. The internal driving mechanism has a supply roller 65, a motor 66 for rotating the roller 65 and a motor driving circuit 67. The belt 63 between the rollers 59 and 60 is wrapped partially around the supply roller 65.

In the recording and reproducing modes, the motor 66 rotates the supply roller 65 in a direction S, and the belt 63 is transported in a direction F2 at a speed v2 which is slightly slower than the tape transport speed v1. The portion of the belt 63 constituting the path 63a is transported clockwise.

Accordingly, a tape portion 22i at the inntermost turn of the tape roll 23 is fed by the belt 63 which forms the path 63a and is fed out to the inner periphery of the stationary reel 20 from the roller 53 at the speed v2. The fed out tape portion 22i is pulled by the capstan 25 and the pinch roller 26.

Therefore, a load acting on the tape 22 which is driven in the state pinched between the capstan 25 and the pinch roller 26 and is transported along a predetermined tape path is considerably reduced compared to that of the conventional video tape recorder.

Furthermore, even when the total length of the tape 22 changes due to a temperature change and the like and a pressure with which the tape portion 22i is wrapped around the belt 63 changes, the tape portion 22i still continues to be fed by the belt 63. As a result, the load acting on the tape transport will not increase and is maintained low.

In addition, the present embodiment of the video tape recorder is provided with a tension pole 70 and a tension detecting circuit 71. The tension pole 70 makes contact with a tape path 22a of the tape 22 between the inner periphery of the stationary reel 20 and the impedance roller 30. The tension detecting circuit 71 detects the tape tension depending on the position of the tension pole 70, and outputs a control signal dependent on the detected tape tension. The control signal from the tension detecting circuit 71 is supplied to a motor driving circuit 67 which drives the motor 66.

When the detected tape tension becomes higher than a predetermined appropriate value, the tension detecting circuit 71 supplies a control signal to the motor driving circuit 67 and controls the motor driving circuit 67 so as to increase the rotational speed of the motor 66. Hence, the transport speed of the belt 63 increases and the tape feed out speed increases. Consequently, a slipping quantity between the tape portion 22i and the belt 63 decreases, and the tape tension is reduced to the predetermined appropriate value On the other hand, when the detected tape tension becomes lower than the predetermined appropriate value, the tension detecting circuit 71 supplies a control signal to the motor driving circuit 67 and controls the motor driving circuit 67 so as to decrease the rotational speed of the motor 66. Hence, the transport speed of the belt 63 decreases and the tape feed out speed decreases. Consequently, the slipping quantity between the tape portion 22i and the belt 63 increases, and the tape tension is increased to the predetermined appropriate value Further, the impedance roller 30 is provided on the entrance side of the drum 24 along the forward tape transport direction Fl.

Therefore, even when the ambient temperature greatly changes, the tape 22 is transported stably with the load acting on the tape transport kept down to a small value, the tape tension maintained at the predetermined appropriate value, and the tape vibration suppressed by the impedance roller 30. As a result, it is possible to carry out the recording and/or reproduction of the video signal in an optimum state where the tape transport is stable. At the time of the reproduction, it is possible to reproduce a picture having a satisfactory picture quality including no jitter or skew.

Figure 5:
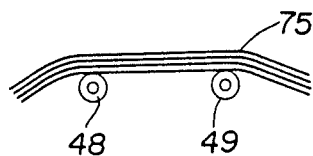
FIG. 5 is a plan view on an enlarged scale showing a part of the tape roll when a magnetic tape is wound directly on rollers.

When the tape 22 is wound directly around the rollers 42 through 53, the tape roll 23 will include a bend 75 at each roller as shown in FIG. 5. In this case, the contour of the tape roll 23 becomes linear between two mutually adjacent rollers. Hence, the slipping quantity becomes different for each turn depending on the position, and the load acting on the tape transport changes. Consequently, the tape transport easily becomes unstable.

But according to the present invention, the belt 63 is provided around the rollers 42 through 53, and the tape roll 23 is formed around the belt 63. As shown in FIG. 2, the contour of the tape roll 23 is approximately a perfect circle concentric to the stationary reel 20 and the slipping quantity becomes uniform at each part along the periphery of the stationary reel 20. Thus, the present embodiment is more preferable than the arrangement shown in FIG. 5 in that the load acting on the tape transport virtually does not change. For these reasons, the tape transport is stable in the present embodiment.

According to the present embodiment, the tape at the inntermost turn of the tape roll on the stationary reel is driven by the belt, thereby making it possible to considerably reduce the load acting on the tape transport. Even when the ambient temperature changes during the operation of the video tape recorder, it is possible to constantly maintain the tape transport stable, and the recording and reproduction of the video signal can be carried out satisfactorily. Especially at the time of the reproduction, it is possible to reproduce a picture including no jitter or skew.

Figure 6:
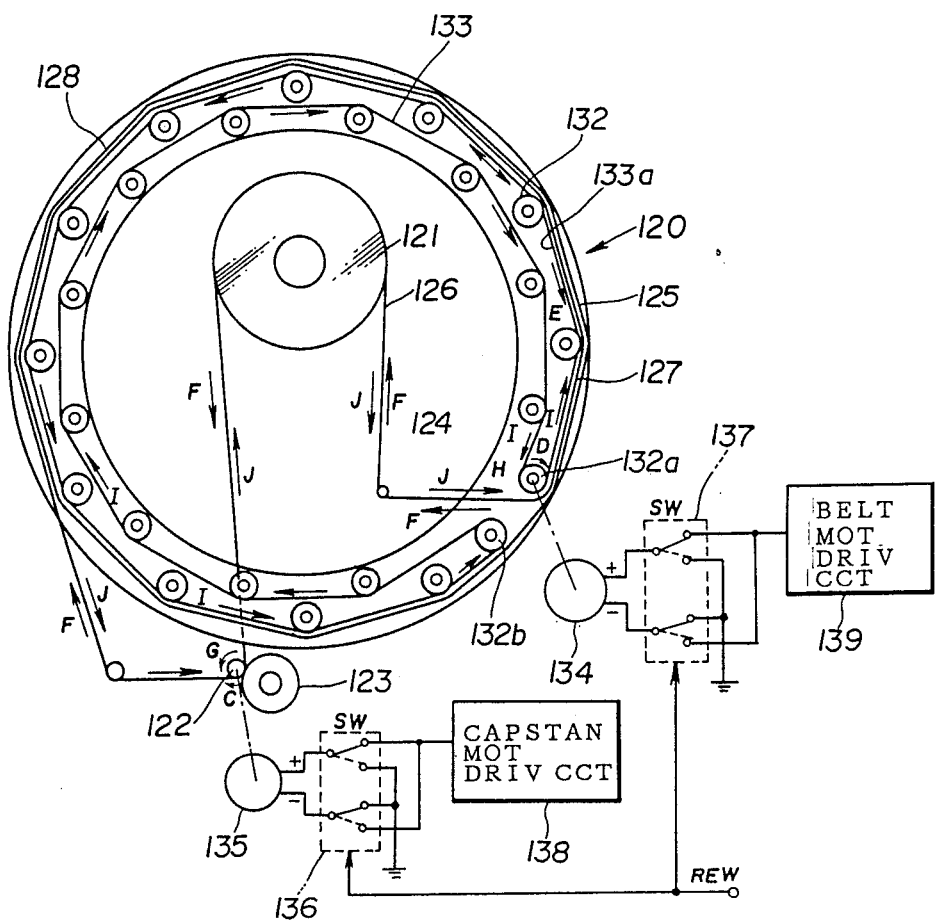
FIG. 6 is a plan view showing an essential part of a second embodiment of the video tape recorder according to the present invention.
Figure 7:
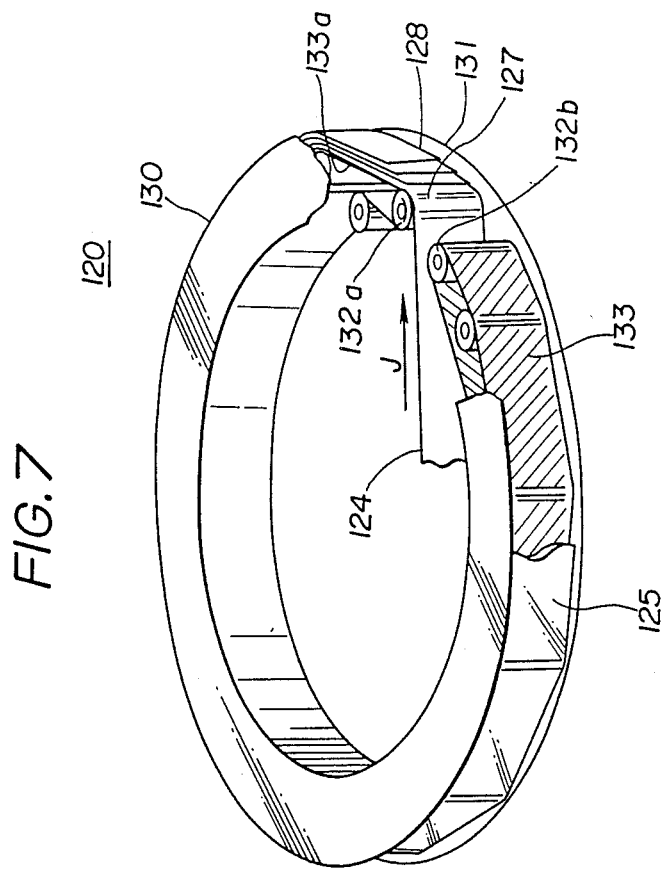
FIG. 7 is a perspective view with a part cut away showing a stationary reel structure shown in FIG. 6.

FIG. 6 shows a second embodiment of the video tape recorder according to the present invention FIG. 7 shows a stationary reel shown in FIG. 6.

In FIGS. 6 and 7, a stationary reel 120 having a large diameter is fixed on a chassis (not shown). A description of the construction of the stationary reel 120 will be given later. A guide drum 121 is provided on the inside of the stationary reel 120, while a capstan 122 and a pinch roller 123 are provided on the outside of the stationary reel 120 in the plan view. An endless magnetic tape 124 has the shape of an endless loop. A large portion of the tape 124 is accommodated within the stationary 120 in the form of a tape roll 125, and a remaining portion of the tape 124 forms a tape path 126.

The tape 124 is drawn out from an inntermost turn 127 of the tape roll 125, and is wrapped around an outer peripheral surface of the guide drum 121. Then, the tape 124 passes between the capstan 122 and the pinch roller 124, and finally reaches an outermost turn 128 of the tape roll 125. The tape path 126 begins from the inntermost periphery of the stationary reel 120 and ends at the outermost periphery of the stationary reel 120.

As also shown in FIG. 7, the stationary reel 120 has upper and lower flanges 130 and 131, and a plurality of rollers 132 are provided along the inner periphery of the upper and lower flanges 130 and 131. An endless belt 133 having the shape of an endless loop is provided around the rollers 132. The belt 133 is provided around the rollers 132 in an approximately C-shape for approximately the entire periphery of the stationary reel 120 excluding a portion between rollers 132a and 132b.

The inntermost turn 127 of the tape roll 125 makes contact with an outer portion 133a of the belt 133. The tape 124 at the inntermost turn 127 passes between the rollers 132a and 132b and is drawn to the inside of the stationary reel 120. The roller 132a is fixed on a rotary shaft of a motor 134. The capstan 122 is rotated by a capstan motor 135.

Next, a description will be given on the operation of the present embodiment of the video tape recorder.

During the normal recording and reproducing modes, switches 136 and 137 are in connected states indicated by a solid line in FIG. 6. The capstan motor 135 is rotated in a forward direction by a capstan motor driving circuit 138, and the capstan 122 rotates in a direction C. The motor 134 is rotated in a forward direction by a belt motor driving circuit 139, and the roller 132a rotates in a direction D. Thus, the belt 133 is transported in a direction E.

Accordingly, the inntermost turn 127 of the tape 24 is fed by the belt 133 and is fed out to the inside of the stationary reel 120. In addition, the tape 124 is transported in a forward direction F by the capstan 122 and the pinch roller 123. A video signal is recorded on or reproduced from the tape 124 by rotary magnetic heads (not shown) mounted on the guide drum 121. Tracks are formed obliquely to the longitudinal direction of the tape 124 as in the case of the first embodiment described before In the recording mode, the user may wish to reproduce a desired portion of the tape 124 recorded slightly before When finding the desired portion, the tape 124 is transported in a reverse direction J by carrying out a rewind operation. The tape 124 is thereafter transported in the forward direction F so as to reproduce the desired portion.

When a manipulation part (not shown) of the video tape recorder is manipulated to instruct the rewind operation, a rewind signal REW is supplied to the switches 136 and 137. The connected states of the switches 136 and 137 are changed as indicated by a phantom line in FIG. 6 responsive to the rewind signal REW. Hence, the motors 135 and 134 rotate in reverse directions, that is, the motor 135 rotates the capstan 122 in a direction G and the motor 134 rotates the roller 132a in a direction H. The belt 133 is transported in a direction I.

When the belt 133 is transported in the direction I, the innermost turn 127 of the tape 124 is fed counter-clockwise by the outer portion 133a of the belt 133 due to the friction between the tape 124 and the belt 133. Thus, the tape 124 drawn to the inside of the stationary reel 120 is taken up on the inner periphery of the tape roll 125. In addition, the movement of the innermost turn 127 is successively transmitted to the outer turns due to the friction between successive turns and finally reaches the outermost turn 128. Therefore, the entire tape roll 125 rotates counterclockwise The tape 124 at the outermost turn 128 is fed out from the tape roll 125. Moreover, the capstan 122 and the pinch roller 123 drive and transport the tape 124 in the reverse direction J.

Accordingly, the tape 124 at the outermost turn 128 is fed out from the tape roll 125, and the fed out tape 124 is driven by the capstan 122 and the pinch roller 123. The tape 124 transported by the capstan 122 and the pinch roller 124 is transported around the outer peripheral surface of the guide drum 121 and is finally taken up on the innermost periphery of the tape roll 125. No unnecessary slack is generated in the tape 124, and the tape 124 is transported in the reverse direction J along the tape path 126. The pressure with which the tape 124 is wound on the tape roll 125 remains the same and will not loosen or tighten.

When the operation mode of the video tape recorder is changed to the reproducing mode after the tape 124 is transported in the reverse direction J for an appropriate quantity, the rewind signal REW ceases and the switches 136 and 137 resume the connection states indicted by the solid line in FIG. 6. As a result, the motors 134 and 135 rotate in the forward directions and the tape 124 is transported in the forward direction F, thereby making it possible to reproduce the desired portion of the tape 124.

It is possible to detect the tape tension of the tape 124 fed out from the outermost turn 128 of the tape roll 125 and adjust the rotational speed of the motor 134 based on the detected tape tension and control the transport speed of the belt 133 so as to positively prevent the tape roll 125 from tightening up excessively.

In addition, out of the rollers 132, it is desirable that those rollers 132 which guide the outer portion 133a of the belt 133 have relatively large diameters so as to prevent bend marks from being permanently made on the belt 133. In the described embodiment, the roller 132a is driven so as to efficiently transmit the driving force to the belt 133, because an angular range for which the belt 133 is wrapped around the roller 132a is the largest among the rollers 132.

Instead of simply rewinding the tape 124 to find the desired portion of the tape 124, it is possible to control the tape transport speed in the reverse direction J and carry out the so-called reverse reproduction or reverse search.

Further, when simply transporting the tape 124 in the reverse direction J without carrying out a reproduction, it is possible to transport the tape 124 by use of the belt 133 alone by slightly separating the pinch roller 123 from the capstan 122.

According to the present embodiment, the endless magnetic tape accommodated in the stationary reel in the form of the tape roll can be transported in both the forward and reverse directions without tightening up the tape roll. For this reason, when there is a need to reproduce a desired portion of the information recorded slightly before, the tape can be simply transported in the reverse direction, and it is unnecessary to transport the tape in the forward direction for almost the entire length of the tape. Because it is possible to transport the tape in the reverse direction, the reverse reproduction can be carried out on the video tape recorder using the endless magnetic tape. In other words, the video tape recorder using the endless magnetic tape can have substantially the same functions as the common video tape recorder having two reels.

FIG. 8 shows a modification of the stationary reel structure shown in FIG. 6. In FIG. 8, those parts which are essentially the same as those corresponding parts in FIG. 7 are designated by the same reference numerals, and a description thereof will be omitted. In the present modification, a stationary reel 120A has a generally oval ring shape. The effects obtainable by the present modification is the same as those obtainable by the above described embodiment. The shape of the stationary reel 120A may be designed appropriately to suit the construction of the endless video tape recorder.

The video tape recorder according to the present invention is not limited to the recording and/or reproduction of the video signal, and various digital data may be recorded and/or reproduced as the information signal.

Further, the present invention is not limited to these embodiments, but various variations and modifications may be made without departing from the scope of the present invention.

What is claimed is:

1. A tape recorder for recording and/or reproducing an information signal on and/or from an endless magnetic tape which has a shape of an endless loop, said tape recorder comprising:
    a stationary reel having an upper flange and a lower flange, said stationary reel having a circular shape;
    a plurality of rollers provided between the upper and lower flanges of said stationary reel;
    an endless belt guided by said rollers and forming an approximate C-shape along an inner periphery of said stationary reel, a large portion of the endless magnetic tape being wound around an outer portion of said endless belt and accommodated within said stationary reel in a form of a tape roll, said endless magnetic tape forming a predetermined tape path with a remaining portion thereof;
    recording and/or reproducing means located on an inside of said stationary reel and making contact with the endless magnetic tape in the predetermined tape path for recording and/or reproducing the information signal on and/or from the endless magnetic tape;
    tape transport means for transporting the endless magnetic tape in at least a forward direction;

belt transport means for transporting said endless belt so as to transport the endless magnetic tape in a direction identical to a direction in which the endless magnetic tape is transported by said tape transport means, said belt transport means operating independently of said tape transport means;

means for detecting a tension of the endless magnetic tape in the predetermined tape path adjacent to an inntermost turn of the tape roll; and means for controlling said belt transport means depending on the detected tension so as to maintain an approximately constant tension;

said endless magnetic tape being drawn out from the inntermost turn of the tape roll and taken up on an outermost turn of the tape roll when the endless magnetic tape is transported in the forward direction.

2. A tape recorder as claimed in claim 1 in which said recording and/or reproducing means includes a guide drum and a pair of rotary magnetic heads mounted on the guide drum for recording and/or reproducing the information signal on and/or from tracks formed obliquely to a longitudinal direction of the endless magnetic tape.

3. A tape recorder as claimed in claim 1 in which said tape transport means is located on the inside of said stationary reel.

4. A tape recorder as claimed in claim 1 in which said tape transport means is located on an outside of said stationary reel.

5. A tape recorder as claimed in claim 1 in which said belt transport means includes a motor for driving one of said rollers.

6. A tape recorder as claimed in claim 1 in which said tape transport means transports the endless magnetic tape at a first speed and said belt transport means transports said endless belt at a second speed, said first speed being slightly higher than said second speed.

7. A tape recorder as claimed in claim 1 in which said endless belt is made of such a material that the outer portion thereof substantially coincides with a perfect circle concentric to said stationary reel.

8. A tape recorder as claimed in claim 1 in which said tape transport means transports the endless magnetic tape in a reverse direction responsive to a rewind instruction.

9. A taper recorder for recording and/or reproducing an information signal on and/or form an endless magnetic tape which has a shape of an endless loop, said tape recorder comprising:

a stationary reel having an upper flange and a lower flange, said stationary reel having a circular shape;

a plurality of rollers provided between the upper and lower flanges of said stationary reel;

an endless belt guided by said rollers and forming an approximate C-shape along an inner periphery of said stationary reel, a large portion of the endless magnetic tape being wound around an outer portion of said endless belt and accommodated within said stationary reel in a form of a tape roll, said endless magnetic tape forming a predetermined tape path with a remaining portion thereof;

recording and/or reproducing means located on an inside of said stationary reel and making contact with the endless magnetic tape in the predetermined tape path for recording and/or reproducing the information signal on and/or from the endless magnetic tape;

tape transport means for transporting the endless magnetic tape in at least a forward direction;

belt transport means for transporting said endless belt so as to transport the endless magnetic tape in a direction identical to a direction in which the endless magnetic tape is transported by said tape transport means;

means for detecting a tension of the endless magnetic tape in the predetermined tape path adjacent to an inntermost turn of the tape roll; and means for controlling said belt transport means depending on the detected tension so as to maintain an approximately constant tension;

said endless magnetic tape being drawn out from the inntermost turn of the tape roll and taken up on an outermost turn of the tape roll when the endless magnetic tape is transported in the forward direction;

said belt transport means including a motor for driving one of said rollers;

said one roller being located at one of two ends of the approximate C-shape.

10. A tape recorder for recording and/or reproducing an information signal on and/or from an endless magnetic tape which has a shape of an endless loop, said tape recorder comprising;

a stationary reel having an upper flange and a lower flange, said stationary reel having a generally oval shape;

a plurality of rollers provided between the upper and lower flanges of said stationary reel;

an endless belt guided by said rollers and forming an approximate C-shape along an inner periphery of said stationary reel, a large portion of the endless magnetic tape being wound around an outer portion of said endless belt and accommodated within said stationary reel in a form of a tape roll, said endless magnetic tape forming a predetermined tape path with a remaining portion thereof;

recording and/or reproducing means located on an inside of said stationary reel and making contact with the endless magnetic tape in the predetermined tape path for recording and/or reproducing the information signal on and/or from the endless magnetic tape;

tape transport means for transporting the endless magnetic tape in at least a forward direction;

belt transport means for transporting said endless belt so as to transport the endless magnetic tape in a direction identical to a direction in which the endless magnetic tape is transported by said tape transport means, said belt transport means operating independently of said tape transport means;

means for detecting a tension of the endless magnetic tape in the predetermined tape path adjacent to an inntermost turn of the tape roll; and means for controlling said belt transport means depending on the detected tension so as to maintain an approximately constant tension;

said endless magnetic tape being drawn out from the inntermost turn of the tape roll and taken up on an outermost turn of the tape roll when the endless magnetic tape is transported in the forward direction.

* * * * *